(12) United States Patent
Tseng et al.

(10) Patent No.: US 8,154,974 B2
(45) Date of Patent: Apr. 10, 2012

(54) HOLOGRAPHIC DATA STORING METHOD AND STORING DEVICE

(75) Inventors: Chien-Fu Tseng, Yunlin County (TW);
Po-Chang Chen, Taipei County (TW);
Feng-Hsiang Lo, Hsinchu County (TW);
Jenn-Hwan Tarng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 515 days.

(21) Appl. No.: 12/400,963

(22) Filed: Mar. 10, 2009

(65) Prior Publication Data

US 2010/0014409 A1 Jan. 21, 2010

(30) Foreign Application Priority Data

Jul. 17, 2008 (TW) ................................ 97127225 A (51) Int. Cl.
*G11B 7/00* (2006.01)
(52) U.S. Cl. ...................................................... 369/103
(58) Field of Classification Search .................. 369/103
See application file for complete search history.

(56) References Cited

U.S. PATENT DOCUMENTS

| 4,676,240 | A | | 6/1987 | Gardy |
| 5,671,073 | A | | 9/1997 | Psaltis et al. |
| 5,808,998 | A | * | 9/1998 | Curtis et al. .................. 369/103 |
| 5,812,288 | A | * | 9/1998 | Curtis et al. .................... 359/21 |
| 5,957,133 | A | | 9/1999 | Hart |
| 6,494,209 | B2 | | 12/2002 | Kulick |
| 7,092,133 | B2 | | 8/2006 | Anderson |
| 7,321,541 | B2 | * | 1/2008 | Horimai ........................ 369/103 |
| 7,483,191 | B2 | * | 1/2009 | Tsukagoshi et al. ............ 359/21 |
| 2003/0151785 | A1 | * | 8/2003 | Vertoprakhov ................. 359/15 |
| 2005/0166928 | A1 | | 8/2005 | Jiang |
| 2007/0047042 | A1 | | 3/2007 | Noguchi |
| 2007/0086307 | A1 | * | 4/2007 | Liedenbaum ................. 369/103 |
| 2007/0164881 | A1 | * | 7/2007 | Schwartz et al. ............... 341/50 |
| 2007/0236763 | A1 | * | 10/2007 | Minabe et al. .................... 359/1 |
| 2007/0268539 | A1 | | 11/2007 | Toishi et al. |
| 2007/0297030 | A1 | * | 12/2007 | Szarvas et al. .................. 359/11 |
| 2008/0062796 | A1 | * | 3/2008 | Bates et al. .................... 365/216 |
| 2008/0297865 | A1 | * | 12/2008 | Hara et al. ....................... 359/12 |
| 2009/0021814 | A1 | * | 1/2009 | Chen et al. ....................... 359/21 |
| 2009/0051990 | A1 | * | 2/2009 | Przygodda et al. ............. 359/30 |
| 2009/0316558 | A1 | * | 12/2009 | Hashimoto et al. ........... 369/103 |

OTHER PUBLICATIONS

"Analysis of Data Recovery Using Bilinear Transformation for Holographic Data Storage System" Po-Chang Chen et al., Electronics & Optoelectronics Research Laboratories, Industrial Technology Research Institute, Hsinchu Taiwan.

(Continued)

*Primary Examiner* — Wayne Young
*Assistant Examiner* — Brenda Bernardi
(74) *Attorney, Agent, or Firm* — Thomas|Kayden (57) ABSTRACT

A holographic data storing method includes the steps of: encoding original data to generate holographic data according to a codeword to symbol relation; and recording a hologram corresponding to the holographic data onto a holographic storage medium. In the codeword to symbol relation, a plurality of sample symbols corresponds to a plurality of codewords. Each of the sample symbols corresponds to a pattern having N*N pixels. There are M bright pixels in the N*N pixels, wherein N and M are positive integers and M is smaller than N*N. A hamming distance of the sample symbols is greater than or equal to 4, and a two-dimensional run-length of the sample symbols is greater than or equal to 2.

10 Claims, 5 Drawing Sheets

OTHER PUBLICATIONS

"Systematic Model of 4-focal Holographic Data Storage System" Chien-Fu Tseng et al., Electronics & Optoelectronics Research Laboratories, Industrial Technology Research Institute, Hsinchu Taiwan Dept. of Communication Engineering, National Chiao Tung University, Hsin-Chu Taiwan.

"Sparse Modulation Coding for Increased Capacity in Volume Holographic Storage" Brian M. King et al., Dec. 10, 2000, vol. 39, No. 35, Applied Optics.

"Information Interchange on Holographic Versatile Disc (HVD) Recordable Cartridges—Capacity: 200 Gbytes per Cartridge" Standard ECMA-377, 1st Edition, May 2007.

Taiwanese language office action dated Oct. 28, 2011.

\* cited by examiner

HOLOGRAPHIC DATA STORING METHOD AND STORING DEVICE

This application claims the benefit of Taiwan application Serial No. 97127225, filed Jul. 17, 2008, the subject matter of which is incorporated herein by reference.

BACKGROUND OF THE INVENTION

1. Field of the Invention

The invention relates in general to a data storing method and a storing device, and more particularly to a holographic data storing method and a holographic data storing device.

2. Description of the Related Art

In the data transmission and data storage field, various channels have been applied to various products. The frequently seen channels include a cable, a wireless network, CD, DVD, HD-DVD, a holographic channel, and the like. Different channels have their specific channel encoding methods. Among these channels, however, the holographic channel has many properties, which are not possessed by many other channels. The holographic channel has the two-dimensional property, and a spatial light modulator (SLM) and a sensor in the holographic system pertain to the two-dimensional devices. Thus, the interference encountered in the transmitted signal or symbol also pertains to the two-dimensional interference.

SUMMARY OF THE INVENTION

According to a first aspect of the present invention, a holographic data storing method is provided. The method includes the steps of: encoding original data to generate holographic data according to a codeword to symbol relation; and recording a hologram corresponding to the holographic data on a holographic storage medium. In the codeword to symbol relation, a plurality of sample symbols corresponds to a plurality of codewords, each of the sample symbols corresponds to a pattern, each of the patterns has N*N pixels, there are M bright pixels in the N*N pixels, N and M are positive integers, and M is smaller than M*N. A hamming distance of the sample symbols is greater than or equal to 4, and a two-dimensional run-length of the sample symbols is greater than or equal to 2.

According to a second aspect of the present invention, a holographic data storing device is provided. The storing device includes a holographic encoder and a holographic data recording unit. The holographic encoder encodes original data to generate holographic data according to a codeword to symbol relation. The holographic data recording unit records a hologram corresponding to the holographic data on a holographic storage medium. In the codeword to symbol relation, a plurality of sample symbols corresponds to a plurality of codewords, each of the sample symbols corresponds to a pattern, each of the patterns has N*N pixels, there are M bright pixels in the N*N pixels, N and M are positive integers, and M is smaller than N*N. A hamming distance of the sample symbols is greater than or equal to 4, and a two-dimensional run-length of the sample symbols is greater than or equal to 2.

The invention will become apparent from the following detailed description of the preferred but non-limiting embodiments. The following description is made with reference to the accompanying drawings.

DETAILED DESCRIPTION OF THE INVENTION

The invention provides a holographic data storing method including the following steps. First, original data is encoded to generate holographic data according to a codeword to symbol relation. Next, a hologram corresponding to the holographic data is recorded on a holographic storage medium. In the codeword to symbol relation, a plurality of sample symbols corresponds to a plurality of codewords. Each of the sample symbols corresponds to a pattern. Each pattern has N*N pixels. There are M bright pixels in the N*N pixels, wherein N and M are positive integers, and M is smaller than N*N. A hamming distance of the sample symbols is greater than or equal to 4, and a two-dimensional run-length of the sample symbols is greater than or equal to 2.

In the following descriptions, N is equal to 5, M is equal to 8, and the codewords are 6-bit codewords.

Figure 1A:
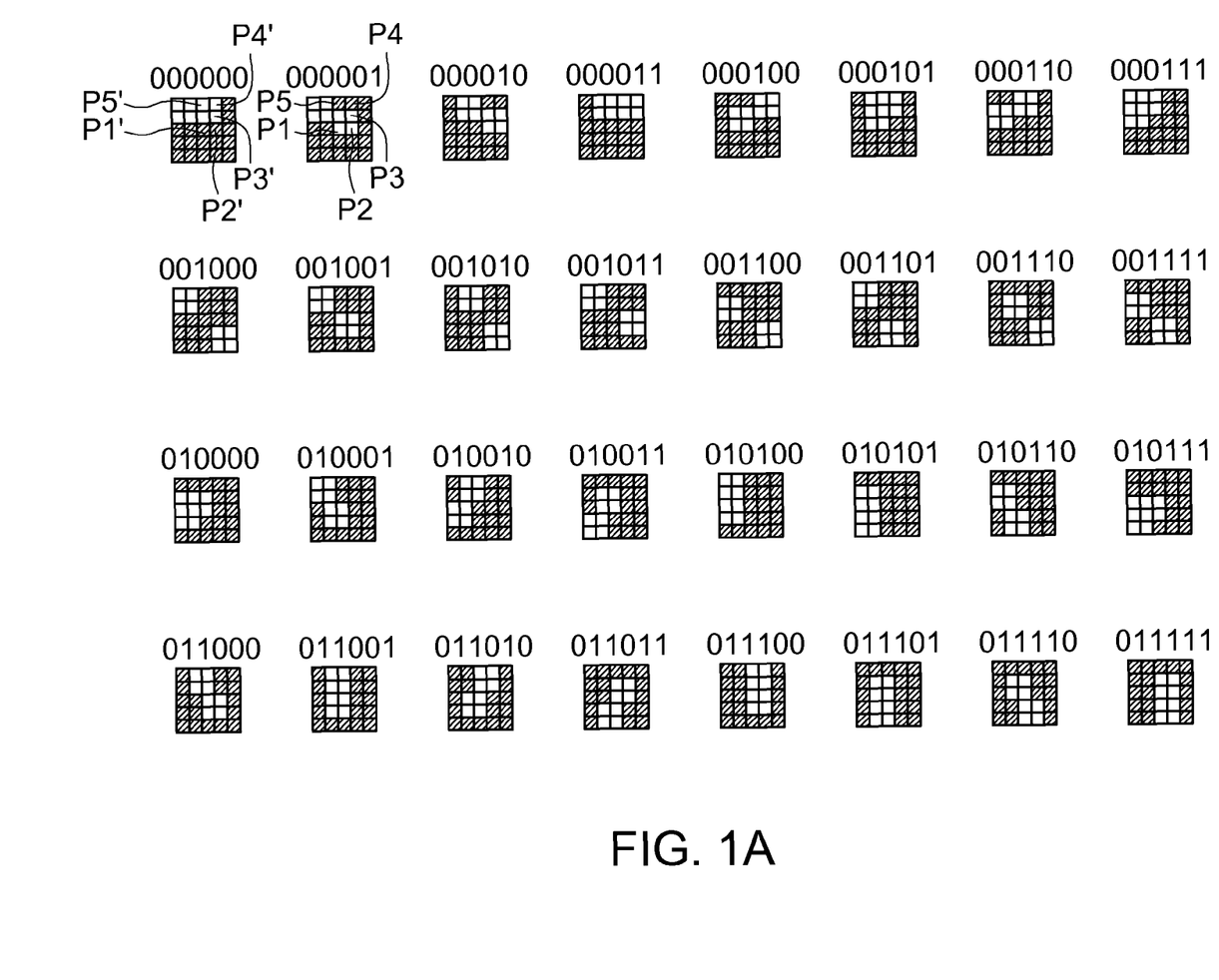
FIGS. 1A and 1B show codeword to symbol relations between a plurality of sample symbols and a plurality of codewords in an example according to an embodiment of the invention.
Figure 1B:
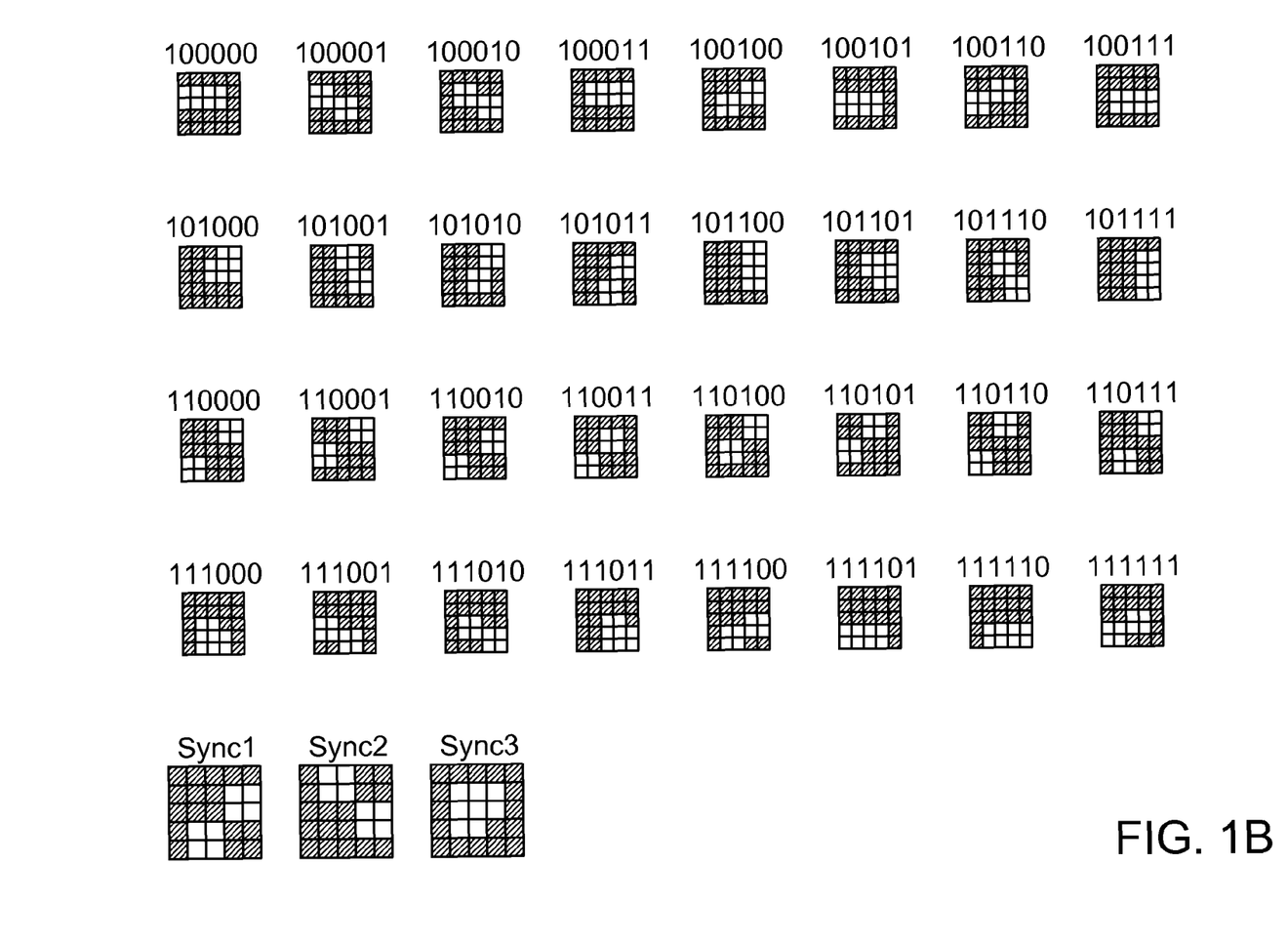

FIGS. 1A and 1B show codeword to symbol relations between a plurality of sample symbols and a plurality of codewords in an example according to an embodiment of the invention. In FIG. 1A and FIG. 1B, several synchronous symbols are depicted in addition to the sample symbols. In this illustrative embodiment, 64 sample symbols and 3 synchronous symbols are illustrated. The 64 sample symbols respectively correspond to the codewords $(000000)_2$ to $(111111)_2$. The three synchronous symbols are the synchronous symbols Sync1, Sync2 and Sync3. Each sample symbol is composed of 5*5(=25) bits of data. Each of these sample symbols corresponds to a pattern. Each pattern is composed of 5*5(=25) pixels. The 25 pixels are arranged in a 5*5 array to form a pixel block. There are 8 bright pixels in the 25 pixels.

The two-dimensional run-length of each sample symbol is equal to 2 in this embodiment. That is, two or more than two neighboring bright pixels must appear in a certain row, and two or more than two neighboring bright pixels must appear in a certain column in a certain pattern. The symbol corresponding to the codeword $(000001)_2$ will be illustrated as an example. There is another bright pixel P2 near the bright pixel P1 in the same row, and there is another bright pixel P3 near the bright pixel P1 in the same column.

The hamming distance of the sample symbols in this embodiment is equal to 4. That is, if 25 pixels corresponding to the patterns of one sample symbol are compared with 25 pixels corresponding to the patterns of another sample symbol at the corresponding positions, the number of pixels corresponding to the same positions but different bright/dark states is greater than or equal to 4. The patterns corresponding to the codewords $(000000)_2$ and $(000001)_2$ will be illustrated as an example. In the patterns of the codeword $(000001)_2$, the pixels P1 and P2 are in the bright state, the pixels P4 and P5 are in the dark state, the pixels P1' and P2' of the patterns corresponding to codeword $(000000)_2$ at the corresponding positions are in the dark state, and the pixels P4' and P5' are in the bright state. Therefore, in the two patterns corresponding to the codewords $(000000)_2$ and $(000001)_2$, the number of pixels having different bright/dark states at the same positions is equal to 4.

In this embodiment, a holographic data storing device is provided to execute the holographic data storing method, for example. The holographic data storing device includes a holographic encoder and a holographic data recording unit. The holographic encoder encodes the original data to generate the holographic data according to the codeword to symbol relation. The holographic data recording unit records the hologram corresponding to the holographic data on the holographic storage medium.

Figure 2:
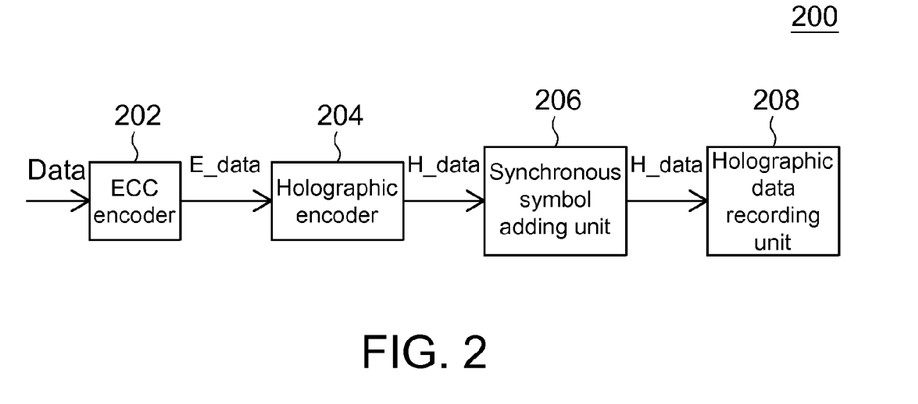
FIG. 2 is a block diagram showing an example of a holographic data storing device.

FIG. 2 is a block diagram showing an example of a holographic data storing device 200. Referring to FIG. 2, the holographic data storing device 200 has an error correcting code (ECC) encoder 202, a holographic encoder 204, a synchronous symbol adding unit 206 and a holographic data recording unit 208. The ECC encoder 202 performs an ECC encoding operation on the original data Data, and outputs the encoded original data E_data to the holographic encoder 204. The holographic encoder 204 encodes the encoded original data E_data to generate the holographic data H_data according to the codeword to symbol relation. For example, the holographic encoder 204 encodes the encoded original data E_data to generate the holographic data H_data according to the corresponding relation between the sample symbols and the codewords shown in FIG. 1A and FIG. 1B.

The synchronous symbol adding unit 206 is for adding a synchronous symbol to the holographic data H_data, outputted from the holographic encoder 204, to generate the data S_data. The synchronous symbol may be one of the synchronous symbols Sync1, Sync2 and Sync3, for example. The synchronous symbol is for indicating a starting position of a unit data quantity, such as the starting position of a data quantity of one data page (512 bits*512 bits) of the holographic data H_data, for example.

Figure 3:
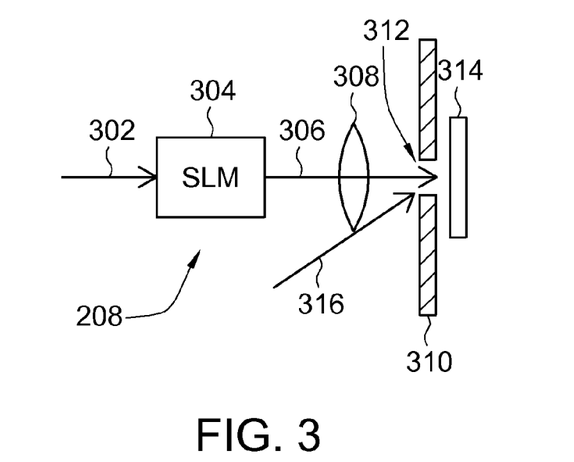
FIG. 3 shows a simplified example of a holographic data recording unit.

The holographic data recording unit 208 records the holographic data H_data to the holographic storage medium. FIG. 3 shows a simplified example of the holographic data recording unit 208. A spatial light modulator (SLM) 304 has patterns corresponding to the holographic data H_data, and the patterns thereof are obtained according to FIG. 1A and FIG. 1B, for example. A laser beam 302 is modulated by the SLM 304 so that a data beam 306 is then generated. An optical device 308 images the data beam 306, which has passed an optical aperture 312 of a light-shading element 310, onto a certain region of a holographic storage medium 314. In addition, a reference light beam 316 is also imaged onto the same region of the holographic storage medium 314 to interfere with the data beam 306 so that the hologram corresponding to the holographic data H_data is formed on the holographic storage medium 314.

Figure 4:
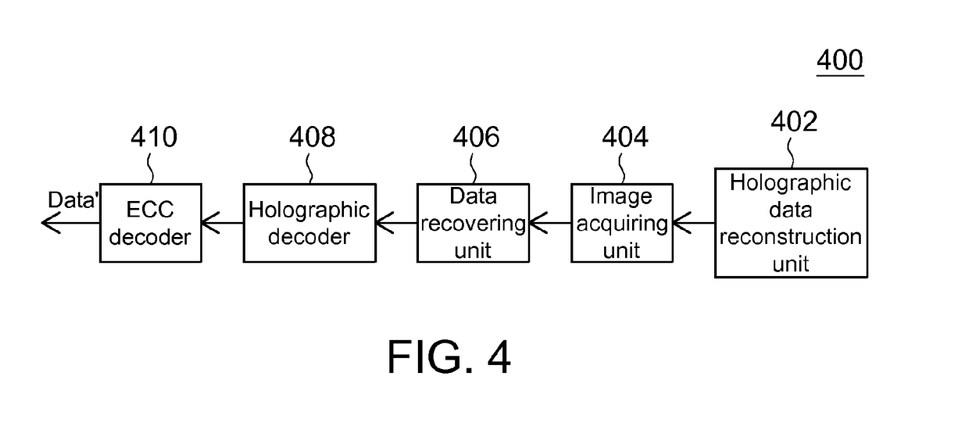
FIG. 4 is a block diagram showing an example of a holographic data reading device.

When the data on the holographic storage medium 314 is to be read, a holographic data reading device may be used. FIG. 4 is a block diagram showing an example of a holographic data reading device 400. Referring to FIG. 4, the holographic data reading device 400 has a holographic data reconstruction unit 402, an image acquiring unit 404, a data recovering unit 406, a holographic decoder 408 and an ECC decoder 410.

Figure 5:
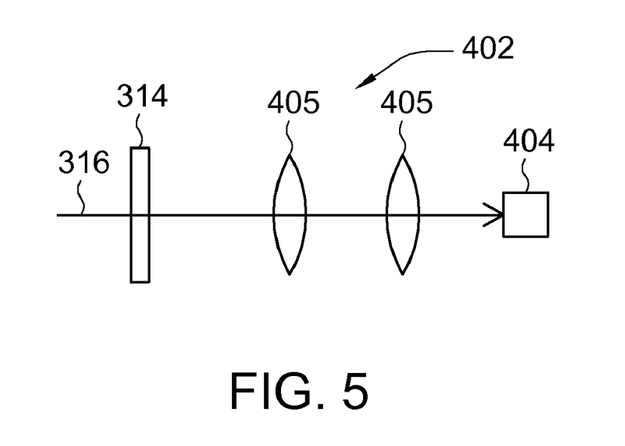
FIG. 5 shows a simplified example of a holographic data reconstruction unit.

The holographic data reconstruction unit 402 reconstructs the hologram on the holographic storage medium 314. FIG. 5 shows a simplified example of the holographic data reconstruction unit 402. As shown in FIG. 5, after the reference light beam 316 illuminates on the holographic storage medium 314, the light beam outputted from the holographic storage medium 314 is imaged onto the image acquiring unit 404 via an optical device 405. The image acquiring unit 404 generates the corresponding electric signal to be outputted to the data recovering unit 406. The image acquiring unit 404 may be implemented by a charge couple device (CCD), for example.

The data recovering unit 406 takes out the data of at least one data page according to the position of the reference synchronous symbol and transmits the data to the holographic decoder 408. Then, the holographic decoder 408 decodes the data according to the corresponding codeword to symbol relation between the sample symbols and the codewords shown in FIG. 1A and FIG. 1B. The decoded data is further decoded by the ECC decoder 410 so that the decoded original data Data' is obtained.

In this embodiment, a 25-bit symbol represents a 6-bit codeword and is thus stored in the holographic storage medium 314. Compared with the original data Data, which has not been holographically encoded and is processed directly by using the corresponding digital patterns (the bright pixel and the dark pixel respectively represent the logic 1 and the logic 0 of the digital data).

The two-dimensional run-length of this embodiment is greater than or equal to 2. Thus, the length and width of the pixel in the hologram used in this embodiment may be respectively equal to one half those of the pixel of the conventional hologram, which has not been holographically encoded. Therefore, the pixel area of this embodiment may be one fourth that of the prior art. Thus, the data quantity that can be stored in the holographic storage medium of this embodiment is greater than or equal to four times that of the prior art when the holographic storage media according to the invention and the prior art have the same area.

That is, when the holographic storage medium is exposed once to generate a relative shift between the light-shading element 310 and the holographic storage medium 314 of FIG. 3 so that the next exposure can be performed, the horizontally or vertically relative shift distance may be one half that of the prior art. Thus, when the embodiment stores the data on the holographic storage medium by way of shift multiplexing, the data quantity that can be stored may be four times that of the prior art.

Figure 6:
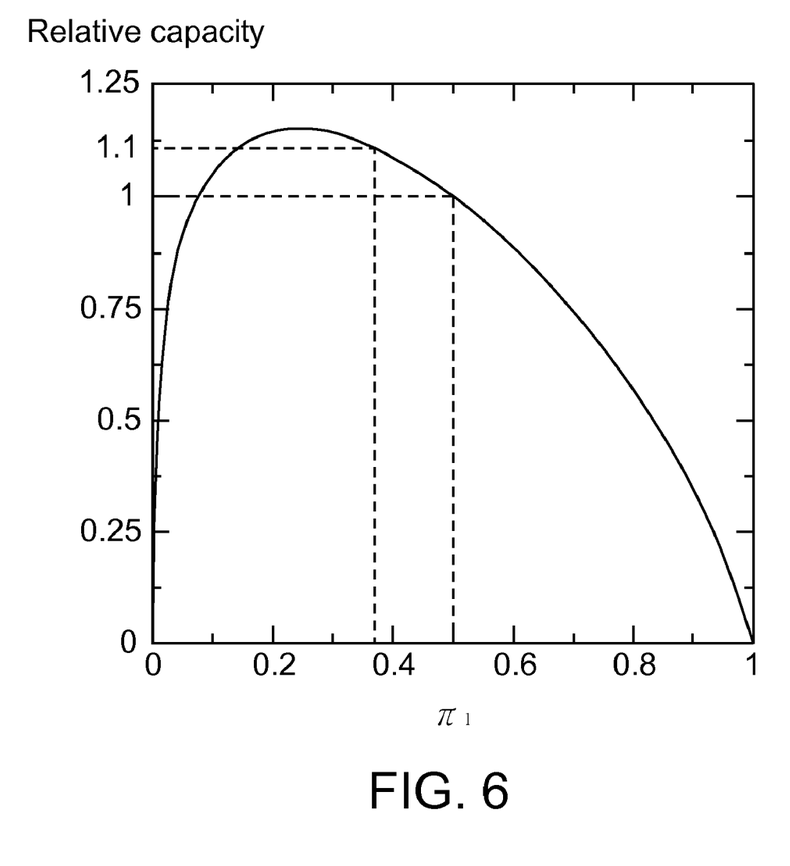
FIG. 6 shows the relation between a ratio of the number of bright pixels to the number of dark pixels and a relative capacity of a storage medium.

FIG. 6 shows the relation between a ratio of the number of bright pixels to the number of dark pixels and a relative capacity of a storage medium.

According to the article entitled "Sparse Modulation Coding for Increased Capacity in Volume Holographic Storage" published by B. M. King and M. A. Neifeld in Appl. Opt. 39, 6681-6688 (2000), it is obtained that the ratio of the number of bright pixels to the number of dark pixels in this embodiment may further enlarge the storage of the holographic storage medium of this embodiment. Because the number of the bright pixels to the number of the dark pixels of all the patterns is equal to 8/25=0.32 in this embodiment, the relative capacity of this embodiment is about 1.1 times that of the prior art as compared with the prior art, in which the ratio of the number of bright pixels to the number of the dark pixels is equal to 0.5.

Thus, it is obtained that the capacity of the holographic storage medium of this embodiment is equal to 1.056 (=8/25*4*1.1) times that of the prior art.

Figure 7:
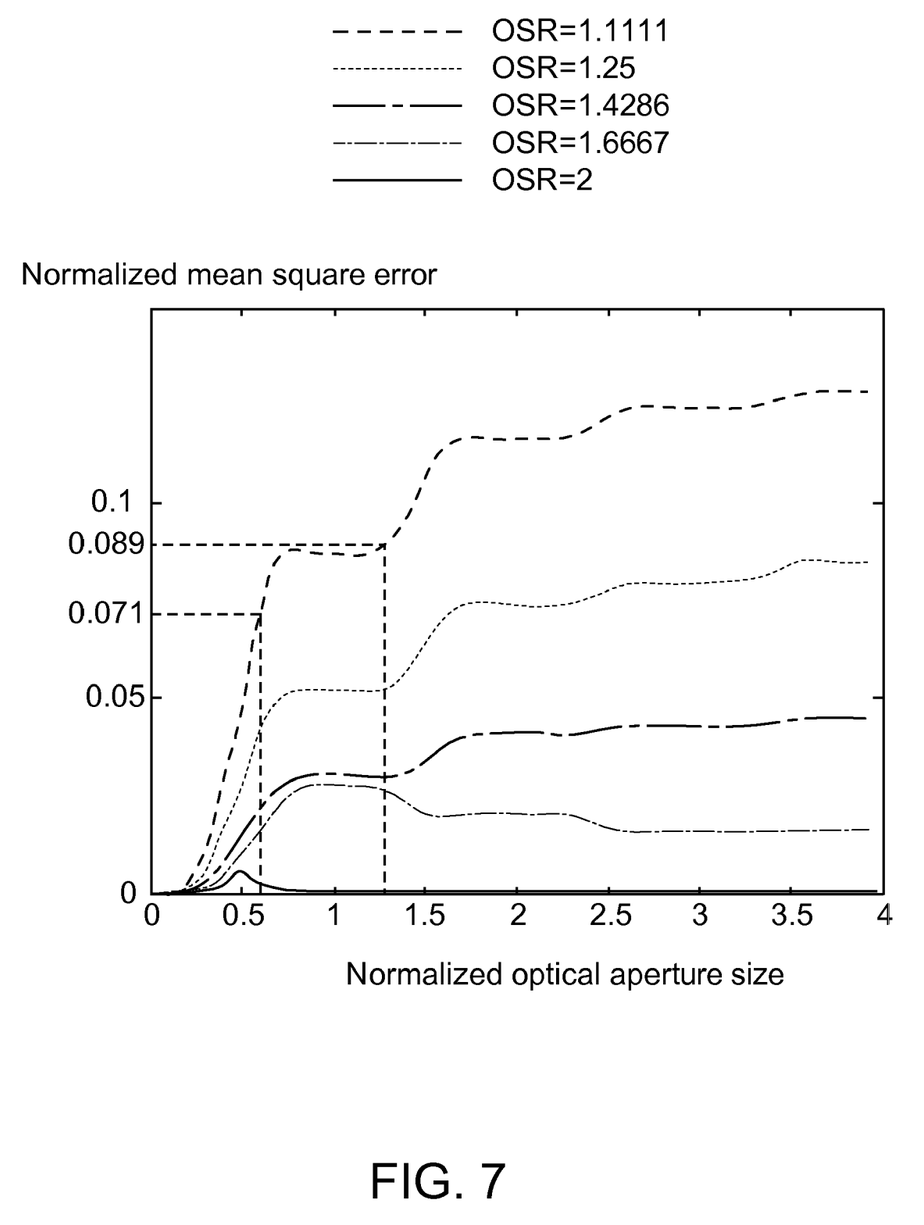
FIG. 7 shows curves of the relations between the normalized optical aperture size and the normalized mean square error under different over-sampling ratios.

FIG. 7 shows curves of the relations between the normalized optical aperture size (Normalized OAS) and the normalized mean square error (NMSE) under different over-sampling ratios (OSRs). The curves are published in the article entitled "Analysis of Data Recovery Using Bilinear Transformation for Holographic Data Storage Systems" by Po-Chang Chen, Chun-Te Wu, Chien-Fu Tseng and Chih-Hao Liu in Taiwan-Korea Data Storage Symposium 2007, p98, Taiwan, October 2007. In the prior art, the OAS must be greater than or equal to a Nyquist aperture value (=1.3) if the digital pattern can be clearly imaged onto the holographic storage element. However, the OAS of this embodiment may be about one half (=0.6) that of the prior art because the two-dimensional run-length is greater than or equal to 2 in this embodiment.

As shown in FIG. 7, when the over-sampling ratio is 1.1111 and the conventional OAS is 1.3, the conventional NMSE is equal to 0.089. When the over-sampling ratio is 1.1111 and the OAS of this embodiment is 0.6, the NMSE of this embodiment is equal to 0.071. Consequently, the NMSE of the embodiment is lower.

In addition, the 25-bit symbol represents the 6-bit codeword in this embodiment, and each pattern has the fixed 8 bright pixels. Thus, the decoding cannot easily go wrong, the error rate may also be lower, and the system stability is also higher. In addition, a more advanced decoding method may also be used to enhance the decoding quality.

Illustrations will be made by taking the image acquiring unit, having the CCD with the resolution of 8 bits per pixel, as an example. The laser beam usually has the higher brightness in a central region, and the lower brightness in a peripheral region, so the image brightness acquired by the pixel of the CCD in the central region is different from that acquired by the pixel of the CCD in the peripheral region. In order to prevent the read error, the system must complicatedly adjust the gain and the offset of the pixel of the CCD so as to judge whether the current image of the CCD pixel is the bright pixel or the dark pixel correctly.

However, this embodiment can judge the symbol corresponding to the pattern without performing the complicated gain and offset adjusting operations. For example, the holographic decoder 408 of this embodiment may further be implemented according to the maximum likehood criteria. This is because that the patterns have the same ratio of the number of bright pixels to the number of dark pixels in this embodiment. Thus, the image acquired by the CCD may be compared with the corresponding patterns corresponding to all the sample symbols one by one so that most similar pattern can be found and the symbol corresponding to the acquired image can be judged. Thus, it is possible to save the long time and the complicated operations for the gain and offset adjusting operations of the CCD pixel so that the decoding efficiency and correctness may be further enhanced.

Although the embodiment is illustrated according to the pattern having 5*5 pixels, the invention is not limited thereto. Various patterns listed in the following table are still deemed as falling within the scope of the invention.

| Pattern Size | The Number of 2 × 2 Bright Pixels | The Number of Symbols That Can Be Corresponded |
|---|---|---|
| 4 × 4 | 1 | 9 |
| 4 × 4 | 2 | 16 |
| 4 × 4 | 3 | 8 |
| 5 × 5 | 2 | 58 |
| 5 × 5 | 3 | 52 |
| 6 × 6 | 1 | 26 |
| 6 × 6 | 2 | 176 |
| 6 × 6 | 3 | 488 |
| 6 × 6 | 4 | 688 |
| 7 × 7 | 2 | 424 |
| 7 × 7 | 3 | 2176 |

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A holographic data storing method, comprising the steps of:

encoding original data to generate holographic data according to a codeword to symbol relation; and recording a hologram corresponding to the holographic data on a holographic storage medium, wherein:

in the codeword to symbol relation, a plurality of sample symbols corresponds to a plurality of codewords, each of the sample symbols corresponds to a pattern, each of the patterns has N*N pixels, there are M bright pixels in the N*N pixels, N and M are positive integers, and M is smaller than N*N, wherein a hamming distance of the sample symbols is greater than or equal to 4, and a two-dimensional run-length of the sample symbols is greater than or equal to 2.

2. The method according to claim 1, wherein N is equal to 5 and M is equal to 8.

3. The method according to claim 1, wherein, the codewords are 6-bit codewords.

4. The method according to claim 1, further comprising the step of:

performing an error correcting code (ECC) encoding operation on the original data.

5. The method according to claim 1, further comprising the step of:

adding a synchronous symbol to the holographic data.

6. A holographic data storing device, comprising:

a holographic encoder for encoding original data to generate holographic data according to a codeword to symbol relation; and a holographic data recording unit for recording a hologram corresponding to the holographic data on a holographic storage medium, wherein in the codeword to symbol relation, a plurality of sample symbols corresponds to a plurality of codewords, each of the sample symbols corresponds to a pattern, each of the patterns has N*N pixels, there are M bright pixels in the N*N pixels, N and M are positive integers, and M is smaller than N*N, wherein a hamming distance of the sample symbols is greater than or equal to 4, and a two-dimensional run-length of the sample symbols is greater than or equal to 2.

7. The device according to claim 6, wherein N is equal to 5 and M is equal to 8.

8. The device according to claim 6, wherein, the codewords are 6-bit codewords.

9. The device according to claim 6, further comprising:
an error correcting code (ECC) encoder for performing an ECC encoding operation on the original data and inputting the encoded original data to the holographic encoder.

10. The device according to claim 6, further comprising:
a synchronous symbol adding unit for adding a synchronous symbol to the holographic data outputted from the holographic encoder.

* * * * *